United States Patent [19]
Kojima

[11] Patent Number: 5,903,104
[45] Date of Patent: May 11, 1999

[54] LIGHTING SYSTEM FOR VEHICLE

[75] Inventor: Mitsunari Kojima, Anjyo, Japan

[73] Assignee: Mitsubishi Jidosha Kogyo Kabushiki Kaisha, Tokyo, Japan

[21] Appl. No.: 08/917,500

[22] Filed: Aug. 26, 1997

[30] Foreign Application Priority Data

Aug. 27, 1996 [JP] Japan .................................. 8-224856

[51] Int. Cl.$^6$ .............................. B60Q 1/02; B60Q 1/14
[52] U.S. Cl. ................................ 315/82; 315/77; 315/83
[58] Field of Search .................................. 315/77, 82, 83

[56] References Cited

U.S. PATENT DOCUMENTS

| | | | |
|---|---|---|---|
| 4,899,083 | 2/1990 | Kataoka et al. | 315/77 |
| 5,381,074 | 1/1995 | Rudzewicz et al. | 315/77 |
| 5,382,877 | 1/1995 | Katsumata et al. | 315/82 |

FOREIGN PATENT DOCUMENTS

7242146  9/1995  Japan .

*Primary Examiner*—Don Wong
*Assistant Examiner*—Wilson Lee

[57] ABSTRACT

A lighting system for a vehicle includes a meter lamp installed in the interior of the vehicle. The meter lamp backlights a dial board of a combination meter. The meter lamp is supplied with a voltage from a battery and lighted up when an ignition switch is closed. An interior lighting lamp is further installed in the interior of the vehicle. The interior lighting lamp is supplied with a voltage from the battery and lighted up when a lighting switch is closed. The system further includes a rheostat switch for adjusting illuminance of the meter lamp and the interior lighting lamp. When one of the meter and interior lighting lamps is lighted up, the rheostat switch adjusts the illuminance of that one of the meter and interior lighting lamps and, when the meter and interior lighting lamps are both lighted up, the rheostat switch simultaneously adjusts the illuminance of the meter and interior lighting lamps.

17 Claims, 5 Drawing Sheets

LIGHTING SYSTEM FOR VEHICLE

FIELD OF THE INVENTION

The present invention relates to a lighting system for a vehicle which is capable of, for example, performing continuous adjustments of the quantity of light of a meter lamp for backlighting a dial board of a combination meter and the quantity of light of a lamp for interior lighting through the same operation.

DESCRIPTION OF THE PRIOR ART

On a vehicle instrument panel, a combination meter is installed in which a speedometer, a tachometer, a fuel gauge and the like are incorporated as a unit. In the types of combination meters, there has been available the high contrast type or the black face type.

Figure 3:
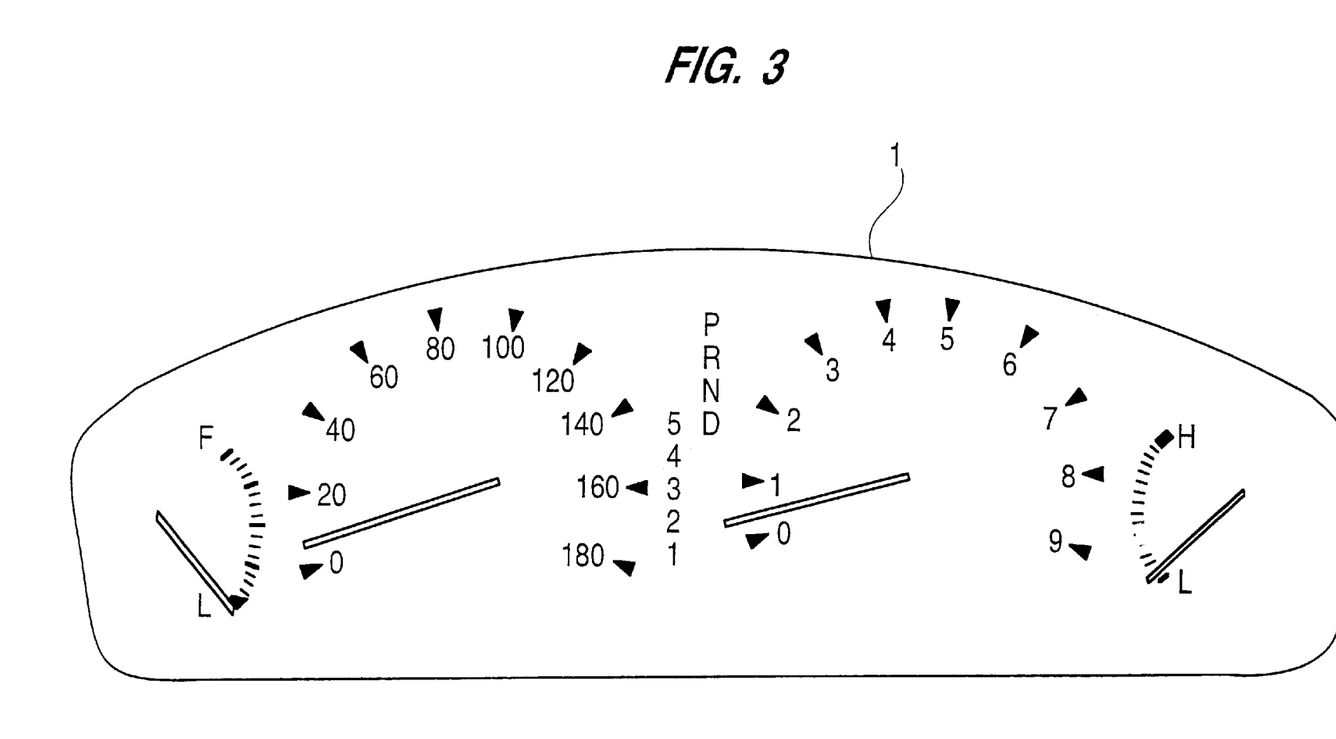
FIG. 3 is a front view showing a combination meter of the high contrast type.
Figure 4:
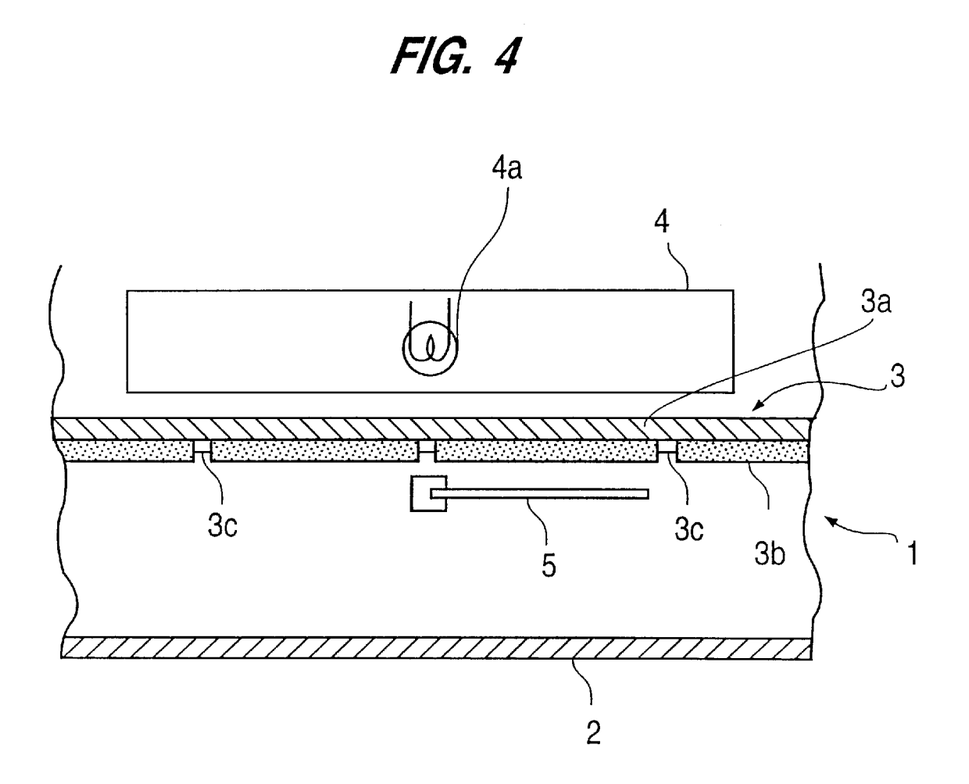
FIG. 4 is a sectional view showing the combination meter shown in FIG. 3.

As shown in FIGS. 3 and 4, a combination meter 1 of the high contrast type includes a smoked glass 2 facing a vehicle compartment, a dial board 3 arranged behind the smoked glass 2, and a lighting portion 4 arranged behind the dial board 3. A pointer 5 is further arranged between the smoked glass 2 and the dial board 3. The smoked glass 2 is made of an acrylic plate which is black and transmits the light therethrough to a certain degree, and so forth. To the pointer 5, a small fluorescent lamp, an LED (light emitting diode) or the like is attached. In general, the pointer 5 is set to white when using the fluorescent lamp. On the other hand, the pointer 5 is set to red when using the LED.

The dial board 3 includes a transparent panel 3a on which black paint 3b and transparent (white and red) paint 3c are printed. The black paint 3b which does not transmit the light at all is used for a background, while the transparent paint 3c is used for meter indication characters (numerals and dial lines). For convenience, the background is shown in white and the meter indication characters are shown in black in FIG. 3, but, actually, the background is black and the meter indication characters are white. The lighting portion 4 incorporates therein a meter lamp 4a for backlighting the dial board 3.

While the meter lamp 4a is turned off, even if looking at the surface of the smoked glass 2 from the compartment side, it is pitch-dark as a so-called black face so that the meter indication characters can be hardly observed. The meter indication characters can be observed only when the meter lamp 4a is turned on to backlight the dial board 3. Accordingly, in the vehicle employing the combination meter 1 of such a high contrast type, it is arranged that, when an ignition key is inserted and rotated to close an ignition switch for starting an engine, the meter lamp 4a is energized via the closed ignition switch so that the meter indication characters can be visually observed.

Figure 5:
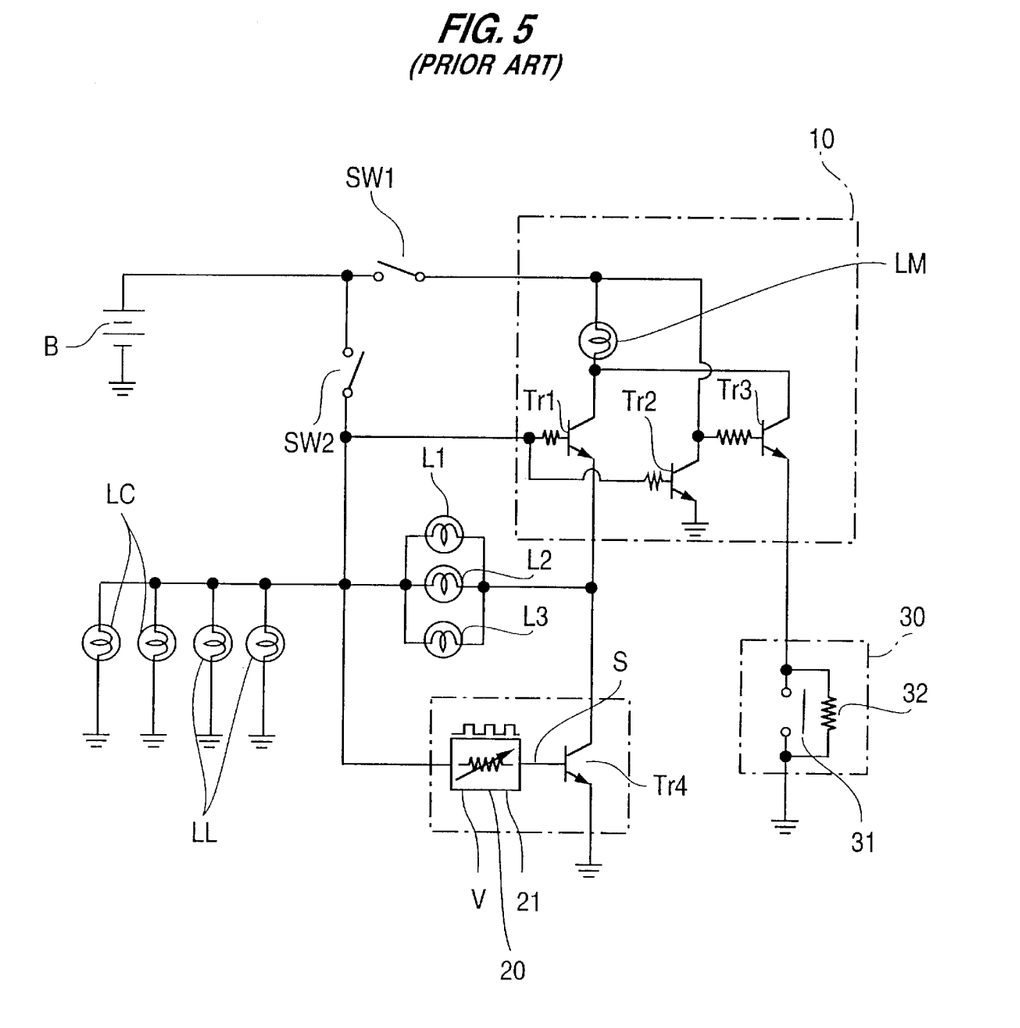
FIG. 5 is a circuit diagram showing a conventional lighting control circuit.

Now, one example of a conventional lighting control circuit for use in a vehicle employing the combination meter of the high contrast type will be explained with reference to FIG. 5. In FIG. 5, B denotes a battery, SW1 an ignition switch, SW2 a tail lamp switch (lighting switch), LC clearance (position)lamps, LL license plate lamps, L1 to L3 interior lighting lamps, 10 a combination meter of the high contrast type, 20 a rheostat switch, and 30 a diurnal dimmer switch.

The interior lighting lamps L1 to L3 are not interior space lamps, but for lighting an indication board (indicating P, L, N, D and so forth) at an indication window of a shift lever, an alarm display board of a hazard switch, indicators of power window operation switches and so forth.

The combination meter 10 includes a meter lamp LM (corresponding to the meter lamp 4a in FIG. 4) for backlighting, and transistors Tr1 to Tr3.

The rheostat switch 20 includes a chopper control circuit 21 and a transistor Tr4.

The chopper control circuit 21 performs a chopper operation while a driving voltage V is inputted to an input terminal (left end in FIG. 5), so as to output a switching signal S having two values (high-level value and low-level value) from an output terminal (right end in FIG. 5). The chopper control circuit 21 can change the duty cycle of the switching signal S in a continuous fashion depending on an adjusting operation by an operator (driver) of a variable resistor or a lever (not shown) attached thereto. Specifically, depending on a magnitude of the operation of the variable resistor or the like, the ratio (duty cycle) between a high-level period and a low-level period in the switching signal S per unit time can be continuously changed.

On the other hand, the transistor Tr4 performs a switching operation while the switching signal S is inputted to its base terminal (control terminal). Since the transistor Tr4 is an n-p-n transistor and works as an emitter follower (common emitter), it is set to the conducting state to draw the current from a collector terminal (input terminal) to an emitter terminal (output terminal) when the switching signal S becomes high, while it is set to the blocking state to inhibit the current flow therethrough when the switching signal S becomes low.

The diurnal dimmer switch 30 includes an on-off switch 31 and a resistor 32 connected in parallel thereto.

Now, an operation of the conventional lighting control circuit shown in FIG. 5 will be explained in three modes, that is, a first mode where the ignition switch SW1 is closed and the tail lamp switch SW2 is open, a second mode where the ignition switch SW1 and the tail lamp switch SW2 are both closed, and a third mode where the ignition switch SW1 is open and the tail lamp switch SW2 is closed.

<Operation in First Mode>

This mode mainly occurs while running in the daytime.

In the first mode (SW1→ON, SW2→OFF), the conducting (ON) and blocking (OFF) states of the transistors Tr1 to Tr3 of the combination meter 10 are as follows:

Tr1→OFF

Tr2→OFF

Tr3→ON

Specifically, since the voltage (high-level voltage) of the battery B is inputted to a base terminal of the transistor Tr3 via the ignition switch SW1, the transistor Tr3 turns on. On the other hand, since no voltage is applied to base terminals of the transistors Tr1 and Tr2 (low-level potential), the transistors Tr1 and Tr2 both turn off.

Accordingly, in the first mode, the current flows along a route of battery B→ignition switch SW1→meter lamp LM→transistor Tr3→diurnal dimmer switch 30→ground. Hence, the meter lamp LM is lighted up so that the meter indication characters of the combination meter 10 of the high contrast type can be visually observed.

In this case, if the on-off switch 31 of the diurnal dimmer switch 30 is closed, no resistance loss is caused at the resistor 32 to allow the large current to -be supplied to the meter lamp LM so that the combination meter 10 becomes brighter. On the other hand, the on-off switch 31 of the diurnal dimmer switch 30 is open, the current flows through the resistor 32 to cause a resistance loss at the resistor 32 so that the current to be supplied to the meter lamp LM becomes smaller and thus the combination meter 10 becomes less bright. Specifically, depending on the ambient brightness, the brightness of the combination meter 10 can be adjusted in two stages by operating the diurnal dimmer switch 30.

In practice, when it is bright around the vehicle, the on-off switch 31 is closed to increase the quantity of light of the meter lamp LM for clearly indicating the meter indication characters. On the other hand, when it is dark around the vehicle, the on-off switch 31 is open to reduce the quantity of light of the meter lamp LM for suppressing the glare of the light.

In the first mode, since the tail lamp switch SW2 is open, no current is supplied to the clearance (position) lamps LC, the license plate lamps LL and the interior lighting lamps L1 to L3 so that these lamps are not lighted up.

<Operation in Second Mode>

This mode mainly occurs while running in the nighttime.

In the second mode (SW1→ON, SW2→ON), the conducting (ON) and blocking (OFF) states of the transistors Tr1 to Tr3 of the combination meter 10 are as follows:

Tr1→ON
Tr2→ON
Tr3→OFF

Specifically, since the voltage (high-level voltage) of the battery B is inputted to the base terminals of the transistors Tr1 and Tr2 via the tail lamp switch SW2, the transistors Tr1 and Tr2 turn on. On the other hand, since the transistor Tr2 turns on, the base terminal of the transistor Tr3 is grounded via the transistor Tr2 so that the transistor Tr3 turns off.

Accordingly, in the second mode, the current flows along the following routes (1) to (3) and the following voltage state (4) is caused to input the driving voltage V to the input terminal of the chopper control circuit 21 of the rheostat switch 20.

The current route (1) is as follows: Specifically, the current flows along a route of battery B-ignition switch SW1→meter lamp LM→transistor Tr1→transistor Tr4→ground. Hence, the meter lamp LM is lighted up so that the meter indication characters of the combination meter 10 of the high contrast type can be visually observed.

The current route (2) is as follows: Specifically, the current flows along a route of battery B→tail lamp switch SW2→interior lighting lamps L1 to L3→transistor Tr4→ground. Hence, the interior lighting lamps L1 to L3 are lighted up.

The current route (3) is as follows: Specifically, the current flows along a route of battery B→tail lamp switch SW2→clearance (position) lamps LC and license plate lamps LL→ground. Hence, the clearance lamps LC and the license plate lamps LL are lighted up.

On the other hand, the voltage of the battery B is inputted to the chopper control circuit 21 of the rheostat switch 20 via the tail lamp switch SW2. Specifically, the driving voltage V is inputted to the input terminal of the chopper control circuit 21. This voltage state is represented by the voltage state (4). In the voltage state (4), as described before, the transistor Tr4 performs the switching operation while the duty cycle of the switching signal S can be changed in a continuous fashion through the adjusting operation by the driver.

Through the switching operation of the transistor Tr4, the mean value of the current flowing along the current route (1), that is, the current supplied to the meter lamp LM, and the mean value of the current flowing along the current route (2), that is, the current supplied to the interior lighting lamps L1 to L3, can be controlled.

Specifically, by increasing a high-level period (ratio) per unit time in the switching signal S, the mean values of the current to be supplied L to the meter lamp LM and the interior lighting lamps L1 to L3 are increased so that the quantities of light of the meter lamp LM and the interior lighting lamps L1 to L3 are increased. On the other hand, by reducing a high-level period (ratio) per unit time in the switching signal S, the mean values of the current to be supplied to the meter lamp LM and the interior lighting lamps L1 to L3 are reduced so that the quantities of light of the meter lamp LM and the interior lighting lamps L1 to L3 are reduced. Since the duty cycle of the switching signal S can be changed continuously, the quantities of light of the meter lamp LM and the interior lighting lamps L1 to L3 can also be changed continuously.

<Operation in Third Mode>

This mode occurs when lighting up the interior lighting lamps L1 to L3 while.the engine is stopped.

In the third mode (SW1→OFF, SW2→ON), the conducting (ON) and blocking (OFF) states of the transistors Tr1 to Tr3 of the combination meter 10 are as follows:

Tr1→ON
Tr2→ON
Tr3→OFF

Specifically, since the voltage (high-level voltage) of the battery B is inputted to the base terminals of the transistors Tr1 and Tr2 via the L tail lamp switch SW2, the transistors Tr1 and Tr2 turn on. On the other hand, since the transistor Tr2 turns on, the base terminal of the transistor Tr3 is grounded via the transistor Tr2 so that the transistor Tr3 turns off.

In the third mode, the ON and OFF states of the transistors Tr1 to Tr3 are the same as those in the second mode. However, since the ignition switch SW1 is open as opposed to the second mode, no current is supplied to the meter lamp LM so that the combination meter 10 of the high contrast type becomes dark to disable the visual observation of the meter indication characters.

Further, in the third mode, the current flows along routes which are the same as the current routes (2) and (3) in the second mode, and the voltage state (4) is caused. Accordingly, through the switching operation of the transistor Tr4, the mean value of the current flowing along the current route (2), that is, the current supplied to the interior lighting lamps L1 to L3, can be controlled.

Specifically, by increasing a high-level period (ratio) per unit time in the switching-signal S, the mean value of the current to be supplied to the interior lighting lamps L1 to L3 is increased so that the quantity of light of the interior lighting lamps L1 to L3 is increased. On the other hand, by reducing a high-level period (ratio) per unit time in the switching signal S, the mean value of the current to be supplied to the interior lighting lamps L1 to L3 is reduced so that the quantity of light of the interior lighting lamps L1 to L3 is reduced. Since the duty cycle of the switching signal S can be changed continuously, the quantity of light of the interior lighting lamps L1 to L3 can also be changed continuously.

Since the current flows along the current route (3), the clearance (position) lamps LC and the license plate lamps LL are lighted up.

In the conventional lighting control circuit shown in FIG. 5, in the first mode (SW1→ON, SW2→OFF), the quantity of light of the meter lamp LM is adjusted in stages (two stages in FIG. 5) depending on whether the on-off switch 31 of the diurnal dimmer switch 30 is open or closed. On the other hand, in the second mode (SW1→ON, SW2→ON), the quantities of light of the meter lamp LM and the interior lighting lamps L1 to L3 are adjusted continuously by adjusting the chopper control circuit 21 of the rheostat switch 20. Further, in the third mode (SW1→OFF, SW2→ON), the quantity of light of the interior lighting lamps L1 to L3 is adjusted continuously by adjusting the chopper control circuit 21 of the rheostat switch 20.

Now, paying attention to the adjustment of the quantity of light of the meter lamp LM, the light quantity adjustment is performed by opening or closing the on-off switch 31 of the diurnal dimmer switch 30 in the first rode (running in the daytime), while the light quantity adjustment is performed by adjusting the chopper control circuit 21 of the rheostat switch 20 in the second mode (running in the nighttime). Thus, to adjust the light quantity of the same meter lamp LM, the objects to be operated differ depending on the mode of operation (running in daytime or nighttime). Hence, for the driver, the light quantity adjustment of the meter lamp LM is a troublesome operation.

Further, in the first mode, by opening or closing the on-off switch 31 of the diurnal dimmer switch 30, the quantity of light of the meter lamp LM can be only adjusted in stages, and can not be adjusted continuously.

SUMMARY OF THE INVENTION

Therefore, it is an object of the present invention to provide a lighting system for a vehicle which is capable of performing continuous adjustments of the quantities of light of a meter lamp and an interior lighting lamp using the same adjusting device regardless of whether running in the daytime or the nighttime.

According to one aspect of the present invention, a lighting system for a vehicle comprises a first lamp installed in the interior of the vehicle, the first lamp supplied with a voltage from a battery and lighted up when a first switch is closed; a second lamp installed to the exterior of the vehicle, the second lamp supplied with a voltage from the battery and lighted up when a second switch is closed; a third lamp installed in the interior of the vehicle, the third lamp supplied with a voltage from the battery and lighted up when the second switch is closed; and a rheostat for adjusting illuminance of the first and third lamps, wherein, when one of the .first and third lamps is lighted up, the rheostat adjusts the illuminance of that one of the first and third lamps and, when the first and third lamps are both lighted up, the rheostat simultaneously adjusts the illuminance of the first and third lamps.

DESCRIPTION OF THE PREFERRED EMBODIMENT

Now, preferred embodiments of the present invention will be described in detail with reference to the accompanying drawings, wherein those elements which perform the same functions as those in the foregoing prior art are assigned the same reference characters.

Figure 1:
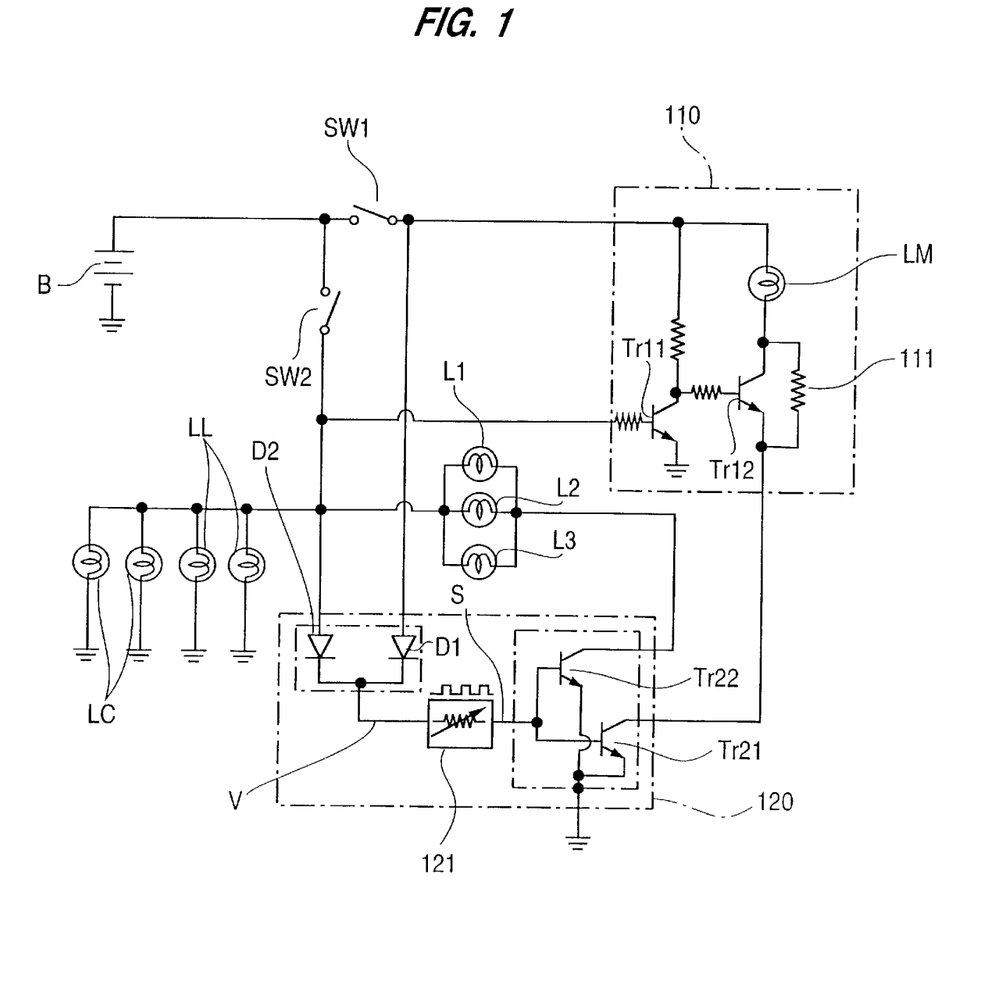
FIG. 1 is a circuit diagram showing a vehicle lighting system according to a first preferred embodiment of the present invention.

A lighting system for a vehicle according to the first preferred embodiment of the present invention will be first described hereinbelow with reference to FIG. 1. In FIG. 1, B denotes a battery, SW1 an ignition switch, SW2 a tail switch (lighting switch), LC clearance (position) lamps, LL license plate lamps, L1 to L3 interior lighting lamps, 110 a combination meter of the high contrast type, and 120 a rheostat switch.

The combination meter 110 includes a meter lamp LM (corresponding to the meter lamp 4a in FIG. 4) for backlighting, transistors Tr11 and Tr12, and a resistor 111. The transistor Tr12 and the resistor 111 are connected in parallel to each other.

The rheostat switch 120 includes a voltage feed diode D1 as a first voltage feed diode, a voltage feed diode D2 as a second voltage feed diode, a chopper control circuit 121, a current control transistor Tr21 in the form of a current control semiconductor switching element provided in a first current control circuit, and a current control transistor Tr22 in the form of a current control semiconductor switching element provided in a second current control circuit.

The voltage feed diode D1 has an anode terminal connected to the ignition switch SW1 and a cathode terminal connected to an input terminal (left end in FIG. 1) of the chopper control circuit 121. Accordingly, when the ignition switch SW1 is closed, the voltage of the battery B is inputted to the input terminal of the chopper control circuit 121 via the ignition switch SW 1 and the voltage feed diode D1. This inputted voltage works as a driving voltage V for driving the chopper control circuit 121.

The voltage feed diode D2 has an anode terminal connected to the tail lamp switch SW2 and a cathode terminal connected to the input terminal of the chopper control circuit 121. Accordingly, when the tail lamp switch SW2 is closed, the voltage of the battery B is inputted to the input terminal of the chopper control circuit 121 via the tail switch SW2 and the voltage feed diode D2. This inputted voltage works as the driving voltage V for driving the chopper control circuit 121.

The chopper control circuit 121 performs a chopper operation while the driving voltage V is inputted to the input terminal thereof, so as to output a switching signal S having two values (high-level value and low-level value) from its output terminal (right end in FIG. 1). The chopper control circuit 121 can change the duty cycle of the switching signal S in a continuous fashion depending on an adjusting operation by an operator (driver) of a variable resistor or a lever (not shown) attached thereto. Specifically, depending on a magnitude of the operation of the variable resistor or the like, the ratio (duty cycle) between a high-level period and a low-level period in the switching signal S per unit time can be continuously changed.

The current control transistor Tr21 has a collector terminal (input terminal) connected to the meter lamp LM via the Tr12 or the resistor 111 of the combination meter 110, a base terminal (control terminal) connected to the output terminal of the chopper control circuit 121, and an emitter terminal (output terminal) which is grounded. On the other hand, the current control transistor Tr22 has a collector terminal (input terminal) connected to the interior lighting lamps L1 to L3, a base terminal (control terminal) connected to the output terminal of the chopper control circuit 121, and an emitter terminal (output terminal) which is grounded.

The current control transistors Tr21 and Tr22 perform switching operations while the switching signal S is inputted to their base terminals. Since the current control transistors Tr21 and Tr22 are n-p-n transistors and work as emitter followers (common emitters), they are set to the conducting state to draw the current from the collector terminals to the emitter terminals, respectively, when the switching signal S becomes high, while they are set to the blocking state to inhibit the current flows therethrough when the switching signal S becomes low.

Now, an operation of the vehicle lighting system according to the first preferred embodiment shown in FIG. 1 will be described in three modes, that is, the first mode where the ignition switch SW1 is closed and the tail lamp switch SW2 is open, the second mode where the ignition switch SW1 and the tail lamp switch SW2 are both closed, and the third mode where the ignition switch SW1 is open and the tail lamp switch SW2 is closed.

<Operation in First Mode>

This mode mainly occurs while running in the daytime.

In the first mode (SW1→ON, SW2→0FF), the conducting (ON) and blocking (OFF) states of the transistors Tr11 and Tr12 of the combination meter 110 are as follows:

Tr11→OFF

Tr12→ON

Specifically, since the tail lamp switch SW2 is open, no voltage is applied to a base terminal of the transistor Tr11 (low-level potential) so that the transistor Tr11 turns off. On the other hand, since the transistor Tr11 is turned off as just described and since the ignition switch SW1 is closed, the voltage (high-level voltage) of the battery B is inputted to a base terminal of the transistor Tr12 via the ignition switch SW1 so that the transistor Tr12 turns on.

Further, the voltage of the battery B is inputted to the chopper control circuit 121 of the rheostat switch 120 via the ignition switch SW1 and the voltage feed diode D1. Specifically, the driving voltage V is inputted to the input terminal of the chopper control circuit 121. In this voltage state, as described before, the current control transistors Tr21 and Tr22 perform the switching operations while the duty cycle of the switching signal S can be changed in a continuous fashion through the adjusting operation by the driver.

Accordingly, in the first mode, the current flows along a route of battery B→ignition switch SW1→meter lamp LM→transistor Tr12→current control transistor Tr21 (performing the switching operation)→ground. Hence, the meter lamp LM is lighted up so that the meter indication characters of the combination meter 110 of the high contrast type can be visually observed.

In this case, through the switching operation of the current control transistor Tr21, the mean value of the current supplied to the meter lamp LM can be adjusted.

Specifically, by increasing a high-level period (ratio) per unit time in the switching signal S, the mean value of the current to be supplied to the meter lamp LM is increased so that the quantity of light of the meter lamp LM is increased. On the other hand, by reducing a high-level period (ratio) per unit time in the switching signal S, the mean value of the current to be supplied to the meter lamp LM is reduced so that the quantity of light of the meter lamp LM is reduced. Since the duty cycle of the switching signal S can be changed continuously, the quantity of light of the meter lamp LM can also be changed continuously.

As described above, in this preferred embodiment, as opposed to the foregoing prior art, an adjustment of the brightness of the combination meter 110 of the high contrast type can be carried out using the rheostat switch 120 while running in the daytime, and further, this brightness adjustment can be changed continuously.

In the first mode, although the current control transistor Tr22 performs the switching operation, since the tail lamp switch SW2 is open, no current is supplied to the clearance (position) lamps LC, the license plate lamps LL and the interior lighting lamps L1 to L3 so that m these lamps are not lighted up.

Further, in accordance with another feature of the invention, since the current control transistor Tr22 has a reverse current blocking effect (reverse current blocking effect of a diode) as a general property, the current flowing through the current control transistor Tr21 to ground is prevented from flowing through the emitter side to the collector side of the current control transistor Tr22. If current were to flow to the collector side of the current control transistor Tr22, such current would flow through the interior lighting lamps L1 to L3 and further through the lamps LC and LL to ground so that the lamps L1 to L3, LC and LL would be lighted up in error. However, in practice, such an error does not occur owing to the reverse current blocking effect of the current control transistor Tr22.

<Operation in Second Mode>

This mode mainly occurs while running in the nighttime.

In the second mode (SW1→ON, SW2→ON), the conducting (ON) and blocking (OFF) states of the transistors Tr11 and Tr12 of the combination meter 110 are as follows:

Tr11→ON

Tr12→OFF

Specifically, since the voltage (high-level voltage) of the battery B is inputted to the base terminal of the transistor Tr11 via the tail lamp switch SW2, the transistor Tr11 turns on. On the other hand, since the transistor Tr11 turns on, the base terminal of the transistor Tr12 is grounded via the transistor Tr11 so that the transistor Tr12 turns off.

Further, the voltage of the battery B is inputted to the chopper control circuit 121 of the rheostat switch 120 via the ignition switch SW1 and the voltage feed diode D1 and via the tail lamp switch SW2 and the voltage feed diode D2. Specifically, the driving voltage V is inputted to the input terminal of the chopper control circuit 121. In this voltage state, as described before, the current control transistors Tr21 and Tr22 perform the switching operations while the duty cycle of the switching signal S can be changed in a continuous fashion through the adjusting operation by the driver.

In the second mode, the current flows along the following routes (1) to (3).

The current route (1) is as follows: Specifically, the current flows along a route of battery B→ignition switch SW1→meter lamp LM→resistor 111→current control transistor Tr21 (performing the switching operation)→ground. Hence, the meter lamp LM is lighted up so that the meter indication characters of the combination meter 110 of the high contrast type can be visually observed.

In this case, since the transistor Tr12, connected in parallel to the resistor 111, is turned off, the current flowing through the meter lamp LM toward the current control transistor Tr21 does not pass through the transistor Tr12, but passes through the resistor 111 bypassing the transistor Tr12. Thus, as compared with the first mode, the value of current passing through the meter lamp LM is reduced so that the quantity of light of the meter lamp LM is automatically reduced. Since the second mode mainly occurs during running in the nighttime and thus it is dark around the vehicle, the visual observation of the meter indication characters of the combination meter 110 is facilitated by reducing the quantity of light of the meter lamp LM as in the second mode.

The current route (2) is as follows: Specifically, the current flows X along a route of battery B→tail lamp switch SW2→interior lighting lamps L1 to L3→current control transistor Tr22 (performing the switching operation) →ground. Hence, the interior lighting lamps L1 to L3 are lighted up.

The current route (3) is as follows: Specifically, the current flows along a route of battery B→tail lamp switch SW2→clearance (position) lamps LC and license plate lamps LL→ground. Hence, the clearance lamps LC and the license lamps LL are lighted up.

Through the switching operations of the current control transistors Tr21 and Tr22, the mean value of the current flowing along the current route (1), that is, the current supplied to the meter lamp LM, and the mean value of the current flowing along the current route (2), that is, the current supplied to the interior lighting lamps L1 to L3, can be controlled.

Specifically, by increasing a high-level period (ratio) per unit time in the switching signal S, the mean values of the current to be supplied to the meter lamp LM and the interior lighting lamps L1 to L3 are increased so that the quantities of light of the meter lamp LM and the interior lighting lamps L1 to L3 are increased. On the other hand, by reducing a high-level period (ratio) per unit time in the switching signal S, the mean values of the current to be supplied to the meter lamp LM and the interior lighting lamps L1 to L3 are reduced so that the quantities of light of the meter lamp LM and the interior lighting lamps L1 to L3 are reduced. Since the duty cycle of the switching signal S can be changed continuously, the quantities of light of the meter lamp LM and the interior lighting lamps L1 to L3 can also be changed continuously.

<Operation in Third Mode>

This mode occurs when lighting up the interior lighting lamps L1 to L3 while the engine is stopped.

In the third mode (SW1→OFF, SW2→ON), the conducting (ON) and blocking (OFF) states of the transistors Tr11 and Tr12 of the combination meter 110 are as follows:

Tr11→ON

Tr12→OFF

Specifically, since the voltage (high-level voltage) of the battery B is inputted to the base terminal of the transistor Tr11 via the tail lamp switch SW2, the transistor Tr11 turns on. On the other hand, since the transistor Tr11 turns on, the base terminal of the transistor Tr12 is grounded via the transistor Tr11 so that the transistor Tr12 turns off.

In the third mode, the ON and OFF states of the transistors Tr11 and Tr12 are the same as those in the second mode. However, since the ignition switch SW1 is open as opposed to the second mode, no current is supplied to the meter lamp LM so that the combination meter 110 of the high contrast type becomes dark to disable the visual observation of the meter indication characters.

Further, in the third mode, the current flows along routes which are the same as the current routes (2) and (3) in the second mode. Accordingly, through the switching operation of the current control transistor Tr22, the mean value of the current flowing along the current route (2), that is, the current supplied to the interior lighting lamps L1 to L3, can be controlled.

Specifically, by increasing a high-level period (ratio) per unit time in the switching signal S, the mean value of the current to be supplied to the interior lighting lamps L1 to L3 is increased so that the quantity of light of the interior lighting lamps L1 to L3 is increased. On the other hand, by reducing a high-level period (ratio) per unit time in the switching signal S, the mean value of the current to be supplied to the interior lighting lamps L1 to L3 is reduced so that the quantity of light of the interior lighting lamps L1 to L3 is reduced. Since the duty cycle of the switching signal S can be changed continuously, the quantity of light of the interior lighting lamps L1 to L3 can also be changed continuously.

Since the current flows along the current route (3), the clearance (position) lamps LC and the license plate lamps LL are lighted up.

Further, as previously explained, since the current control transistor Tr21 has a reverse current blocking effect (reverse current blocking effect of a diode) as a general property, the current flowing through the current control transistor Tr22 to ground is prevented from flowing through the emitter side to the collector side of the current control transistor Tr21. If current were to flow to the collector side of the current control transistor Tr21, such current would further flow through the resistor 111 and the meter lamp LM and further through the transistor Tr11 to ground so that the meter lamp LM would be lighted up in error. However, in practice, such an error does not occur owing to the reverse current blocking effect of the current control transistor Tr21.

Figure 2:
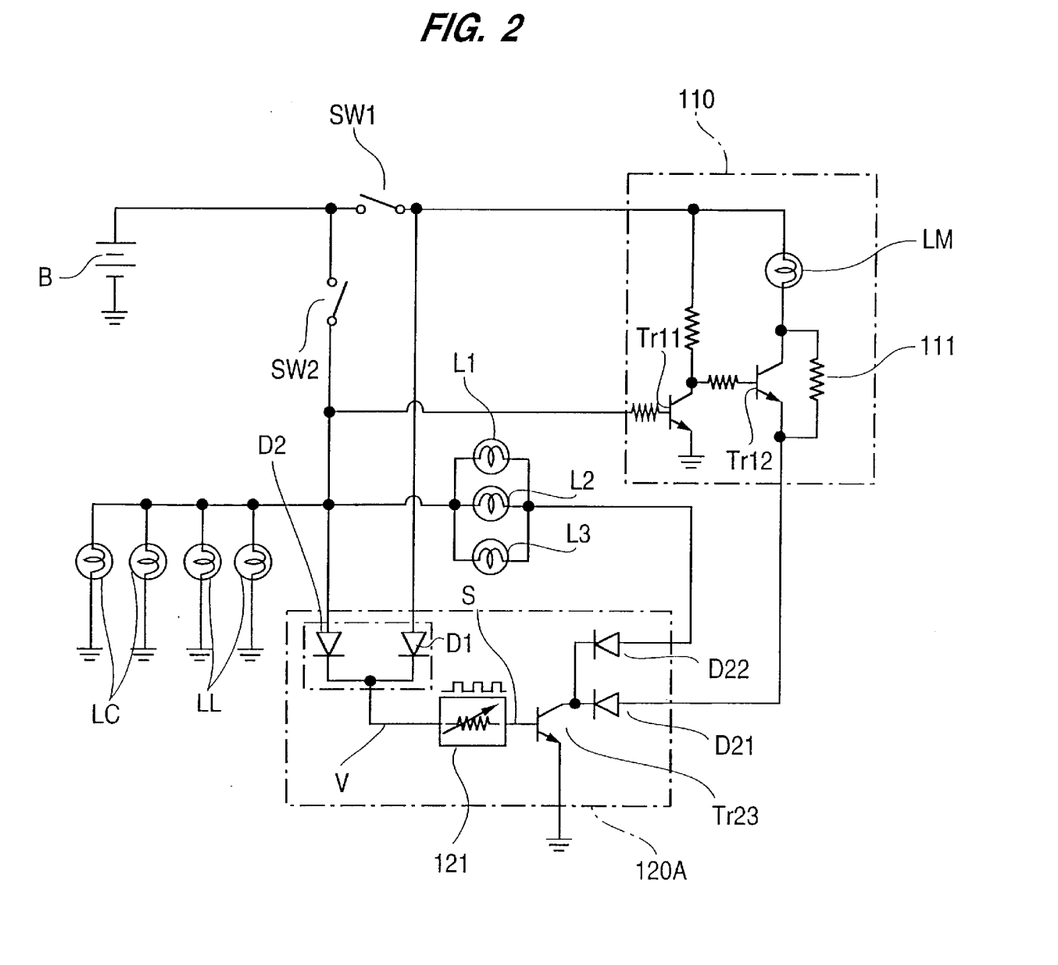
FIG. 2 is a circuit diagram showing a vehicle lighting system according to a second preferred embodiment of the present invention.

Now, a lighting system for a vehicle according to the second preferred embodiment of the present invention will be described hereinbelow with reference to FIG. 2. In FIG. 2, a rheostat switch 120A includes voltage feed diodes D1 and D2, a chopper control circuit 121, a current control transistor Tr23, a reverse current blocking diode D21 as a first reverse current blocking diode, and a reverse current blocking diode D22 as a second reverse current blocking diode.

Specifically, in FIG. 2, the switching functions of the current control transistors Tr21 and Tr22 of the rheostat switch 120 in FIG. 1 are collectively achieved by the current control transistor Tr23, and the reverse current blocking functions of the current control transistors Tr21 and Tr22 in FIG. 1 are achieved by the reverse current blocking diodes D21 and D22, respectively. In other words, the rheostat switch 120A in FIG. 2 only differs from the rheostat switch 120 in FIG. 1 in that the current control transistors Tr21 and Tr22 are replaced by the current control transistor Tr23 and the reverse current blocking diodes D21 and D22. An operation of the rheostat switch 120A is the same as that of the rheostat switch 120.

The other structure is the same as that of the vehicle lighting system according to the first preferred embodiment shown in FIG. 1.

The vehicle lighting system according to the second preferred embodiment operates like the vehicle lighting system according to the first preferred embodiment. In the second preferred embodiment, since the number of the transistors used in the system is reduced as compared with the first preferred embodiment, the structure is simplified correspondingly although a capacity of the current control transistor Tr23 is set greater than that of the current control transistor Tr21 or Tr22.

In the foregoing preferred embodiments, bipolar transistors are used as the semiconductor switching elements. However, various other semiconductor switching elements, for example, unipolar transistors, such as FET's, may also be used.

The lighting switch may be a switch for turning on exterior lamps, such as tail lamps, position lamps and small lamps, and interior lamps, such as hazard switch lamps and power window switch lamps.

As described, the combination meter may be of the high contrast type, wherein the meter indication portions can be visually observed when backlighting is performed and can not be visually observed when no backlighting is performed.

As appreciated from the foregoing description, according to the vehicle lighting system of the present invention, it may be arranged that a rheostat (120, 120A) includes a first current control circuit for adjusting an amount of current supplied to a first lamp (LM) when a first switch (SW1) is closed, and a second current control circuit for adjusting an amount of current supplied to a third lamp (L1, L2, L3) when a second switch (SW2) is closed.

It may be arranged that the first current control circuit includes a first switching element (Tr21) or a common switching elements (Tr23) for adjusting the amount of the current supplied to the first lamp (LM), and a chopper control circuit (121) for switching ON-OFF states of the first or common switching element.

It may be arranged that the second current control circuit includes a second switching element (Tr22) or the common switching element (Tr23) for adjusting the amount of the current supplied to the third lamp (L1, L2, L3), and a chopper circuit (121) for switching ON-OFF states of the second switching element.

It may thus be arranged that the switching element (Tr23) further adjusts the amount of the current supplied to both the first lamp (LM) and the third lamp (L1, L2, L3).

It may be arranged that the rheostat includes a rectifier (Tr22, D22) for preventing the current passing through the first lamp (LM) from flowing to a second lamp (LC, LL) and/or the third lamp (L1, L2, L3).

It may be arranged that the rheostat includes a rectifier (Tr21, D21) for preventing the current passing through the third lamp (L1, L2, 25 L3) from flowing to the first lamp (LM).

It may be arranged that the vehicle lighting system further includes a light modulating means (Tr11, Tr12, 111) for adjusting illuminance of the first lamp (LM) depending on opening and closing of the second switch (SW2).

It may be arranged that the light modulating means includes a switching element (Tr11, Tr12) for adjusting the amount of the current supplied to the first lamp (LM) depending on opening and closing of the second switch (SW2).

It may be arranged that the first lamp (LM) illuminates a meter (1) provided forward of a driver seat.

It may be arranged that the meter (1) is of a high contrast type and can be visually observed only when the first lamp is lighted up.

It may be arranged that the second lamp is a clearance (position) lamp (LC).

It may be arranged that the second lamp is a license plate lamp (LL).

It may be arranged that the third lamp illuminates a shift range for a transmission installed in the vehicle.

It may be arranged that the third lamp illuminates an operating portion of accessories installed in the interior of the vehicle.

As described in detail in terms of the preferred embodiments, according to the present invention, for example, the quantity of light of the meter lamp for backlighting the combination meter and the quantity of light of the interior lighting lamp can be adjusted only by operating the rheostat switch regardless of whether running in the daytime or the nighttime. Specifically, since the driver can adjust the brightness of, for example, the combination meter and the interior lighting lamp only by operating the rheostat switch regardless of daytime or nighttime, the driver does not feel the brightness adjustment troublesome and thus can concentrate on driving the vehicle.

Further, in case that the quantity of light of the meter lamp for backlighting the combination meter and the quantity of light of the interior lighting lamp are adjusted by the rheostat switch, not only the quantity of light of the interior lighting lamp, but also the quantity of light of the meter lamp can be adjusted continuously.

What is claimed is:

1. A lighting system for a vehicle, comprising:

a first lamp installed in the interior of said vehicle, said first lamp connected in a first circuit path and supplied with a voltage from a battery and lighted up when a first switch in the first circuit path is closed;

a second lamp installed on the exterior of said vehicle, said second lamp connected in a second circuit path and supplied with a voltage from said battery and lighted up when a second switch in the second circuit path is closed;

a third lamp installed in the interior of said vehicle, said third lamp connected in a third circuit path and supplied with a voltage from said battery and lighted up when said second switch, also connected in said third circuit path, is closed; and a rheostat supplied with voltage in another circuit path and coupled to said first and third circuit paths for adjusting illuminance of said first and third lamps, wherein, when one of said first and second switches is closed to light up the first or the third lamp, said rheostat adjusts the illuminance of said first lamp or said first and third lamp and, when said first and second switches are both closed, said first and third lamps are both lighted up, and said rheostat simultaneously adjusts the illuminance of said first and third lamps.

2. A lighting system according to claim 1, wherein said rheostat comprises a first current control circuit for adjusting an amount of current supplied to said first lamp in the first circuit path when said first switch, is closed, and a second current control circuit for adjusting an amount of current supplied to said third lamp in the third circuit path when said second switch is closed.

3. A lighting system according to claim 2, wherein said first current control circuit comprises a first switching element for adjusting the amount of the current supplied to said first lamp, and a chopper control circuit for switching ON-OFF states of said first switching element.

4. A lighting system according to claim 2, wherein said second current control circuit comprises a second switching element for adjusting the amount of the current supplied to said third lamp, and a chopper control circuit for switching ON-OFF states of said second switching element.

5. A lighting system according to claim 1, wherein said rheostat comprises a current control circuit for adjusting the current supplied to the said first lamp in the first circuit path when said first switch is closed, and for adjusting the current supplied to said third lamp in the third circuit path when said second switch is closed.

6. A lighting system according to claim 2, wherein said rheostat comprises circuitry in which a blocking rectifier prevents current passing through said first lamp from flowing through said second lamp and/or said third lamp.

7. A lighting system according to claim 2, wherein said rheostat comprises circuitry in which a blocking rectifier prevents current passing through said third lamp from flowing through said first lamp.

8. A lighting system according to claim 1, further comprising a light modulating means coupled to the first circuit path for adjusting the illuminance of said first lamp, apart from rheostat adjustment of the illuminance of the first lamp, according to whether said second switch is open or closed.

9. A lighting system according to claim 8, wherein said light modulating means comprises another switching element and a resistor respectively in parallel branches of the first circuit path, and a circuit for opening and closing said another switching element according to opening and closing of said second switch.

10. A lighting system according to claim 1, wherein said first lamp illuminates a meter provided forward of a driver seat.

11. A lighting system according to claim 10, wherein said meter is of a high contrast type and can be visually observed only when said first lamp is lighted up.

12. A lighting system according to claim 1, wherein said second lamp is a clearance lamp.

13. A lighting-system according to claim 1, wherein said second lamp is a license lamp.

14. A lighting system according to claim 1, wherein said third lamp illuminates a shift range indicating portion of a transmission installed in said vehicle.

15. A lighting system according to claim 1, wherein said third lamp illuminates an operating portion of accessories installed in the interior of said vehicle.

16. A lighting system according to claim 1 wherein a first diode is connected from said first circuit path, downstream of said first switch, to said rheostat and a second diode is connected from said second circuit path, downstream of said second switch, to said rheostat thereby isolating the operation of the first and second circuit paths.

17. A lighting system according to claim 5 wherein a first diode is connected in the first circuit path and a second diode is connected in the third circuit path to enable said rheostat to control lamp illuminance according to operation of said first and second switches.

* * * * *